(12) United States Patent
Fuzisawa et al.

(10) Patent No.: US 6,336,181 B1
(45) Date of Patent: Jan. 1, 2002

(54) MICROCOMPUTER HAVING BUILT-IN SERIAL INPUT-OUTPUT CIRCUIT

(75) Inventors: Yukio Fuzisawa; Takehiro Furukawa; Takashi Yamasaki, all of Hyogo (JP)

(73) Assignees: Mitsubishi Electric Semiconductor Software Co., Ltd., Itami; Mitsubishi Denki Kabushiki Kaisha, Tokyo, both of (JP)

(*) Notice: Subject to any disclaimer, the term of this patent is extended or adjusted under 35 U.S.C. 154(b) by 1138 days.

(21) Appl. No.: 08/498,819

(22) Filed: Jul. 6, 1995

(30) Foreign Application Priority Data

Jan. 30, 1995  (JP) .............................. 7-012711

(51) Int. Cl.[7] .......................... G06F 13/38; G06F 15/00
(52) U.S. Cl. ........................... 712/39; 710/71
(58) Field of Search ............................. 395/800, 200.1, 395/200.19, 200.2, 878, 880, 881, 550, 825–827, 840, 841, 875, 885, 891; 341/100, 101; 364/140, 166; 710/71, 240; 712/39

(56) References Cited

U.S. PATENT DOCUMENTS

| | | | | |
|---|---|---|---|---|
| 4,447,804 A | * | 5/1984 | Allen | ......................... 341/100 |
| 4,939,741 A | * | 7/1990 | Miyazaki | .................... 371/37.1 |
| 5,068,783 A | * | 11/1991 | Tanagawa et al. | ..... 395/183.03 |
| 5,361,374 A | * | 11/1994 | Sasaki et al. | ................ 395/800 |
| 5,396,225 A | * | 3/1995 | Okada et al. | .................. 463/40 |

FOREIGN PATENT DOCUMENTS

| DE | 35 39 039 C2 | 8/1993 |
|---|---|---|
| EP | 0 506 330 A2 | 9/1992 |

OTHER PUBLICATIONS

Roth, Charles, H., "Fundamentals of Logic Design", 3rd ed. 1085, pp. 268–269.*
Mitsubishi Electrical Corporation, M38063 M6–XXXFP/GP, pp. 12, 84–89.
International Organization for Standardization, Road Vehicles—Low Speed Serial Data Communication, 1991, pp. 1–36, ISO/DIS 11519–3 (J1850).
Kalinka et al., "Mikroconroller mit serieller Schnittstelle", Design & Elektronik, vol. 4, Feb. 11, 1992, pp. 63, 64 and 67.

* cited by examiner

Primary Examiner—Larry D. Donaghue
(74) Attorney, Agent, or Firm—McDermott, Will & Emery (57) ABSTRACT

A microcomputer is realized having a built-in SIO which is able to correspond to a LAN which requires strict timing control and also correspond to a high speed serial communication. A counter supplies.a clock signal for data shift to an SIO register which performs serial-parallel conversion and vice versa. Two D flip-flop circuits detect the rise of an SRDY signal, an input signal expressing the start of transmission, and give the counter a reset signal.

9 Claims, 8 Drawing Sheets

MICROCOMPUTER HAVING BUILT-IN SERIAL INPUT-OUTPUT CIRCUIT

BACKGROUND OF THE INVENTION

1. Field of the Invention

The present invention relates to a microcomputer having a built-in serial input-output circuit.

2. Description of the Prior Art

Figure 7:
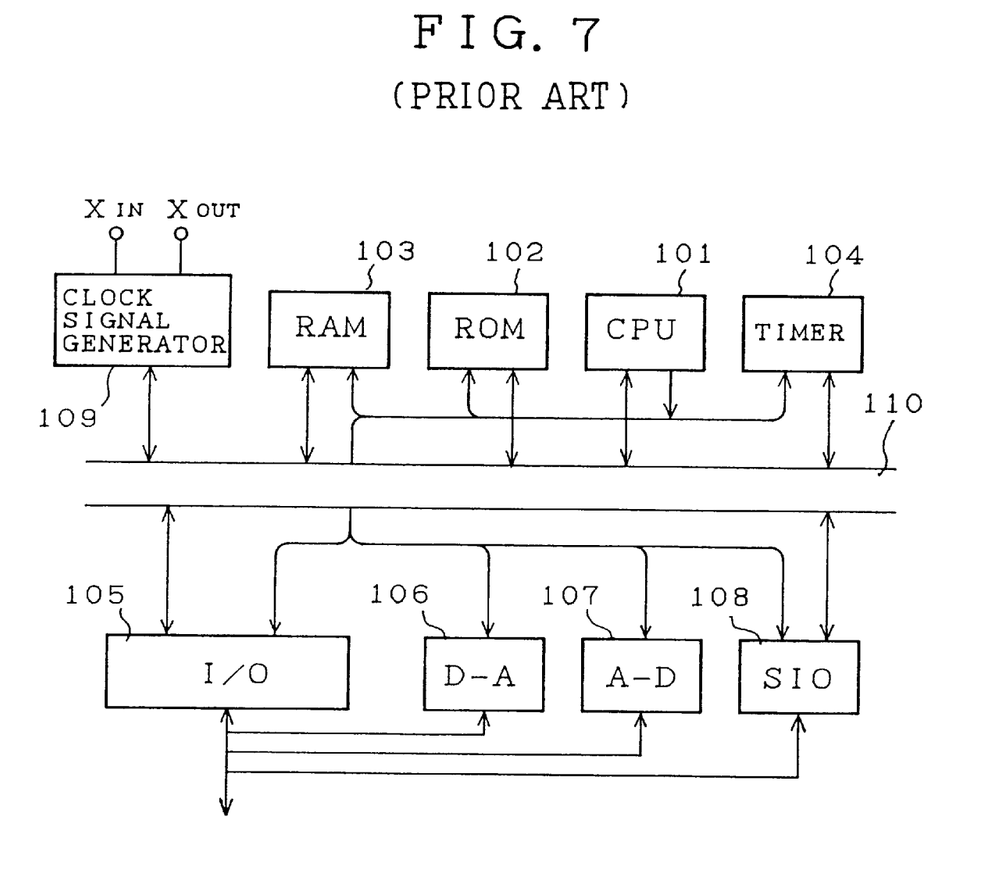
FIG. 7 is a block diagram showing an internal configuration of a conventional one-chip microcomputer.

FIG. 7 is a block diagram showing the internal configuration of a conventional one-chip microcomputer shown in the user's manual (issued on October 1990 by Mitsubishi Electric Corporation) for a one-chip microcomputer M38063 M6-XXXFP/GP manufactured by Mitsubishi Electric Corporation. In the figure, 101 is a CPU which executes predetermined operation or control according to a program stored in a ROM 102, 103 is a RAM for storing data, 104 is a timer for measuring necessary period of time, etc., 105 is an input-output port (IO port) for exchanging data with an external circuit, 106 is a D-A converter which converts digital values into analog values and outputs them to the external circuit, 107 is an A-D converter which converts analog values into digital values and outputs them to the external circuit, 108 is a serial input-output circuit (SIO) which converts serial data from the external circuit into parallel data, and converts parallel data into serial data and outputs them to the external circuit, 109 is a clock signal generator, and 110 is a data bus. In the case of this microcomputer, an input-output line for the D-A converter 106, the A-D converter 107 and the SIO 108 is used in common with an input-output line for IO port 105.

Figure 8:
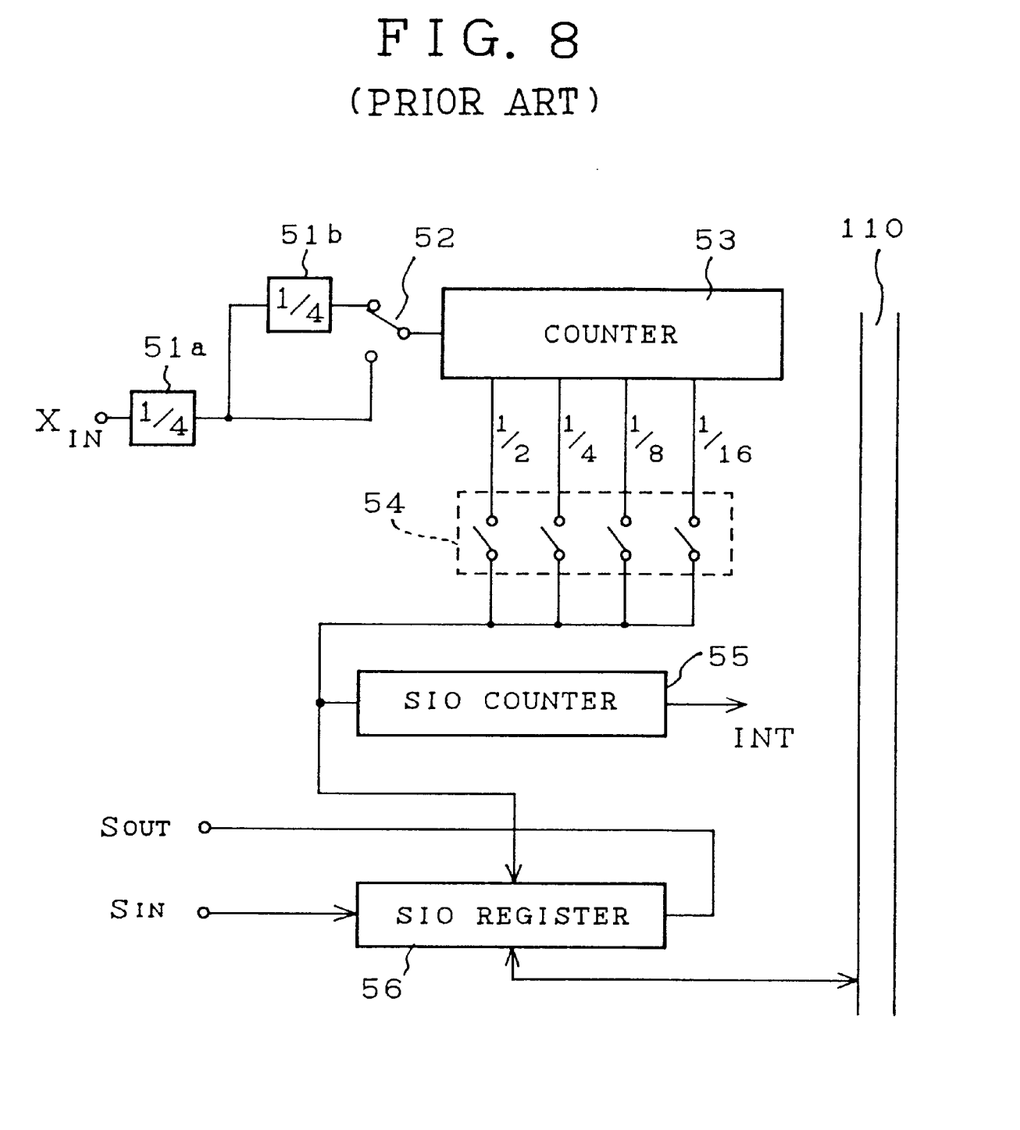
FIG. 8 is a block diagram showing an internal configuration of an SIO in a conventional one-chip microcomputer.

FIG. 8 is a block diagram showing the internal configuration of the SIO 108 which is shown in the above-mentioned user's manual. In the figure, 51a is a frequency divider which divides the frequency of a clock signal from an $X_{in}$ to a ¼ frequency, 51b is a frequency divider which further divides the above divided frequency to a ¼ frequency, 52 is a switch for selecting a clock signal either a clock signal of the ¼ frequency or a clock signal of the 1/16 frequency, 53 is a counter for further dividing the frequency of the clock signal of the divided frequency, 54 is a switch for selecting a clock signal out of signals of divided frequencies which are obtained by further division of the frequency of the signal input to the counter 53, 55 is an SIO counter which counts the frequency of a clock signal from the switch 54, and 56 is an SIO register which converts the serial data input from an $S_{in}$ terminal into parallel data according to a clock signal from the switch 54 and also converts parallel data into serial data according to the clock signal from the switch 54 and outputs them to an $S_{out}$ terminal.

Next, the operation will be explained. In this place, the operation concerning the SIO 108 will be explained. In a case of transmission, the CPU 101 writes the transmission data to the SIO register 56 after the execution of a predetermined setting for the IO port 105. The SIO register 56 shifts data according to the clock signal from the switch 54. The bits squeezed out of SIO register 56 are output to the $S_{out}$ terminal. When the SIO counter 55 is informed that all data are output to the $S_{out}$ terminal by a count value, it gives an interrupt signal to the CPU 101. If there are data to be transmitted, CPU 101 writes the data to the SIO register 56.

In a receiving period, the SIO register 56 takes in data input from the $S_{in}$ terminal according to the clock signal from the switch 54 and shifts them bit by bit. When the SIO counter 55 is informed that the quantity of data corresponding to the capacity of the SIO register 56 is input to it by a count value, it gives an interrupt signal to the CPU 101 for example. Then the CPU 101 takes in data from the SIO register 56.

In the above explanation, the clock signal from the switch 54, that is, the internal clock signal is used as a clock signal to shift the contents of the SIO register 56; however, a clock signal supplied from an external circuit can be also used.

It is considered to constitute a LAN utilizing the SIO function of a microcomputer. For example, there is an ISO/DIS 11519-3 (J1850) LAN standard as a standard which is applicable to such a LAN. The J1850 standard is of a bus type LAN standard, which is so called a multimaster system. In the J1850 standard, there is a period of time in which respective terminal stations output their address signals following to the period of time for outputting start bits. When a certain terminal station, a certain microcomputer in this place, send out a start bit to a bus, other microcomputers which desire to send out data start to output start bits to the bus simultaneously. Further, respective microcomputers send out their addresses in synchronization to the bus. The data such as start bits or addresses are PWM pulses. The respective addresses are so allotted that an address of a microcomputer of a highest priority is left on the bus.

The data on the bus are compared with the address of a terminal station and if they coincide a transmitting right is allotted to the terminal station. The process for acquiring the transmitting right is called arbitration, and the comparison between the data on the bus and the address of the terminal station is called arbitration judgment. It is shown in an example shown in FIG. 9 that since a third bit in an address sent out by a microcomputer on a A side does not coincide with the address on the bus, the microcomputer on the A side stops the transmission of data after the output of the address, and an address sent out by a microcomputer on a B side coincides with that on the bus, so that the microcomputer on the B side continues transmission of data.

In order to make such arbitration judgment possible, the timing of a start bit has to be strictly detected in a microcomputer. Otherwise, the sending-out timings of respective microcomputers are dispersed and judgment will be made impossible. If it is desired to realize the timing detection of a start bit in a conventional microcomputer, at first, the realization in using software is considered. In other words, the bus is introduced with one bit of the input port and the appearance of a start bit on the bus is detected by software. However, it requires more than several machine cycles to detect the existence of a start bit on the bus in searching the input port, so that the detection of the bit can be too late. The input port has to be supervised by the software all the time, and the occupying time of the CPU by the soft ware is lengthened. Therefore actually, it will be difficult to execute arbitration judgment by software.

It is also considered to realize the arbitration with hardware, wherein the output of data in the SIO register 56 is made enable by the start bit. However, the timing of the start bit and a clock signal to be given to the SIO register 56 are asynchronous. Therefore, there is probability of the occurrence of delay of 1 clock pulse cycle at a maximum from the timing of a start bit to the sending-out timing of data in the SIO register 56.

In the above explanation, a LAN according to the J1850 standard is taken up as an example; however, in the case of a conventional SIO, there is always the probability of delay in a start of sending out of transmitting data as far as a method is used in which the sending out of transmission data is stated by a trigger signal. As described in the above, in a case where data check on a bus in a LAN is performed, much time is needed for executing the program, so that the period of time to be shared for other processes, (a protocol control process, for example) is decreased. Therefore, if the transfer speed of a LAN is upgraded, there is a probability that the period of time to be shared for other software processes is made insufficient. In other words, in a case where data check on the bus in a LAN is performed by software, it is impossible to improve much the transfer speed of data in the LAN.

Since a conventional microcomputer is constituted as described in the above, there is a problem that a built-in SIO 108 cannot be utilized fully in the LAN which requires strict timing control for an arbitration judgment, etc. There is also another problem that a load on the software is heavy, so that the system is not able to correspond to a high speed serial communication.

SUMMARY OF THE INVENTION

The present invention is invented to solve the problems as described in the above, and an object of the present invention is to offer a microcomputer having a built-in SIO which is able to correspond to a LAN which requires strict timing control and also to correspond to a high speed serial communication.

A microcomputer according to the present invention comprises an initialization means for initializing a clock signal supply means in the SIO with an input from an external circuit, the clock signal supply means which supplies a data transfer clock signal to a serial input-output means.

The initialization means initializes immediately the clock signal supply means at the change in a signal level from an external circuit; thereby, it is possible to decreases the delay of the output start timing of the serial data output from the serial input-output means for the timing of change in the signal level from the external circuit.

A microcomputer according to another aspect of the present invention further comprises a changeover means for changing over an input-output direction of a shift register which constitutes the serial input-output means, a switch having contact points to be connected to the midway in the shift register, and a switch setting means for closing a contact point corresponding to a bit length of a datum.

The switch setting means makes the length of a shift register variable equivalently in changing over contact points to be closed and makes transmission and reception of data having an arbitrary length easy.

A microcomputer of a further aspect according to the present invention is further provided with a comparison means for comparing an input signal and an output signal to and from the shift register.

The comparison means detects immediately the difference between the input signal and the output signal and decreases a detecting load for data collision on a bus in a LAN for example.

DETAILED DESCRIPTION OF THE PREFERRED EMBODIMENTS

Embodiment 1

Figure 1:
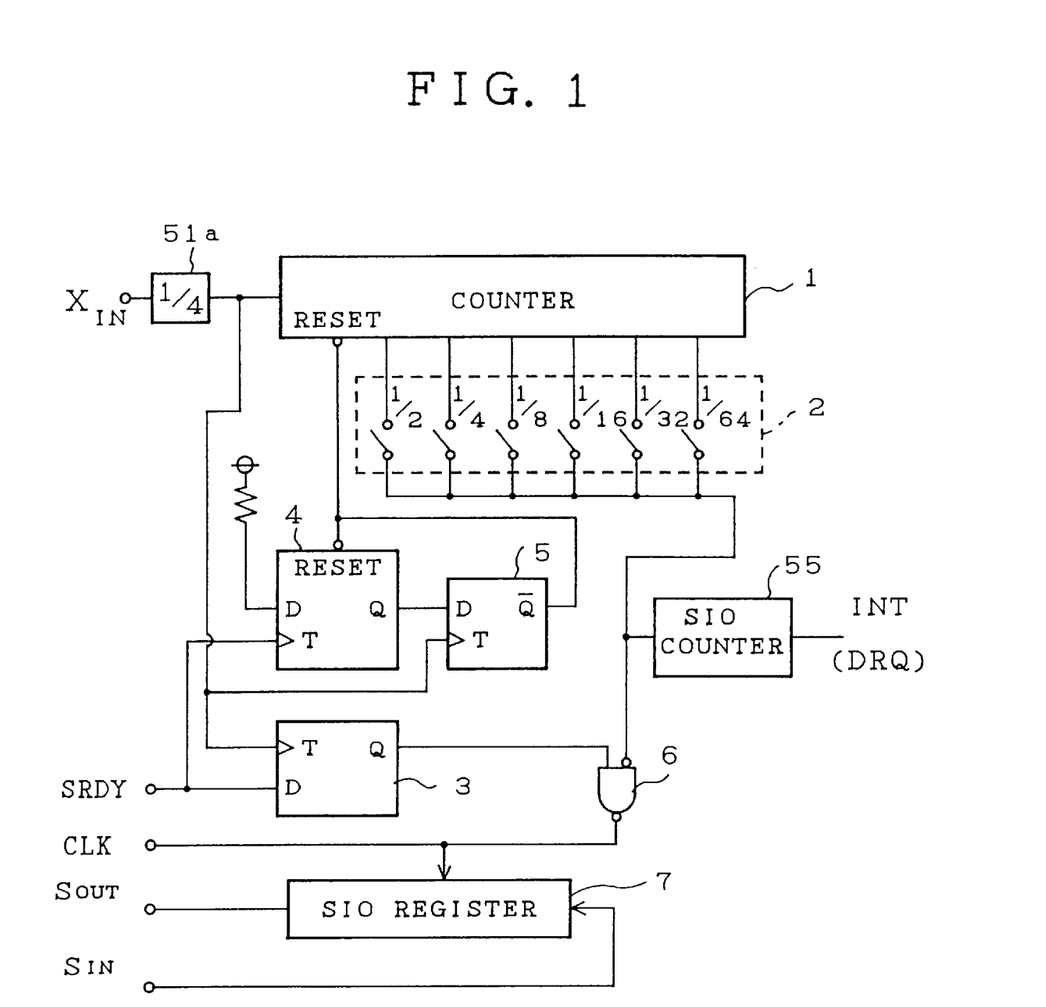
FIG. 1 is a block diagram showing the configuration of a built-in SIO in a microcomputer in an embodiment 1 according to the present invention.

FIG. 1 is a block diagram showing the configuration of a built-in SIO in a microcomputer in a first embodiment according to the present invention. In the FIG., 1 is a counter for further dividing the frequency a clock signal $X_{1/4}$, an output of a frequency divider 51a; 2 is a switch for selecting one of the following divided frequencies divided by the counter 1 in accordance with a data transfer speed: a 1/2 frequency output, a 1/4 frequency output, a 1/8 frequency output, a 1/16 frequency output, a 1/32 frequency output or a 1/64 frequency output; 3 is a D flip-flop circuit which latches an SRDY signal with a clock signal $X_{1/4}$ (hereinafter referred to as DFF); 4 is a DFF which outputs a high level signal at a Q output terminal when an SRDY signal rises; 5 is another DFF which latches the Q output signal of the DFF 4 with the clock signal $X_{1/4}$; 6 is an AND gate which passes a clock signal from the switch 2 when the output signal at the Q output terminal is in a high level; and 7 is an SIO register which makes the output of the AND gate 6 a clock signal.

The SIO register 7 realizes a serial input-output means, the counter 1 and the switch 2 realizes a clock signal supply means, and the DFF's, 4 and 5, realize an initialization means. The whole configuration of a microcomputer is as shown in FIG. 7, for example. However, the constitution of an SIO is different from the one shown in FIG. 7.

Figure 2:
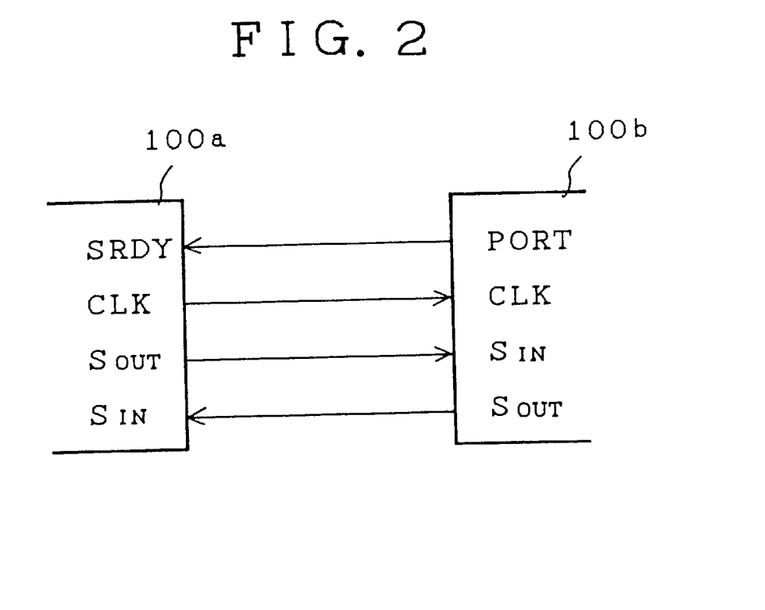
FIG. 2 is a block diagram showing the configuration in a case where data transfer is performed between 2 microcomputers.

Next, the operation will be explained. The case where data transfer is performed between 2 microcomputers having built-in SIO's as shown in FIG. 1 will be taken up as an example. In this case, as shown in FIG. 2, an output port of a microcomputer 100b (slave side) is connected to an SRDY terminal of another microcomputer 100a (master side). In a case where 2 SIO's, #1 SIO and #2 SIO, are provided, #1 $S_{in}$ terminal of a microcomputer is connected to a #2 $S_{out}$ terminal of another microcomputer and a #2 $S_{in}$ terminal of a microcomputer is connected to a #1 $S_{out}$ terminal of another microcomputer; thereby, full duplex serial communication is made possible.

The microcomputer 100b on the slave side makes the output port be in a high level when the preparation for reception is completed. When a high level signal is input to the SRDY terminal in the microcomputer 100a on the master side, a high level signal appears at the Q output terminal of the DFF 4, then a low level signal is made to appear at a reversal Q output terminal of the DFF 5 by the rise of the clock signal $X_{1/4}$. Since the reversal Q output terminal of the DFF 5 is connected to a reset input terminal of the counter 1, it is reset. The reversal Q output terminal of the DFF 5 is also connected to the reset input terminal of the DFF 4, the Q output terminal of the DFF 4 is made to a low level.

Therefore, the reversal Q output terminal of the DFF 5 is made to be in a high level by the rise of the next clock signal $X_{1/4}$ and the reset state of the counter 1 is released.

In other words, since the count value of the counter 1 is returned to 0, at this point of time respective outputs fall. The switch 2 selects one of the respective counter outputs beforehand, however even if any one has been selected, the clock signal from the switch 2 falls. After that, a selected clock signal continues to be output.

The Q output terminal of the DFF 3 is made to a high level by the rise of a clock signal $X_{1/4}$ which appears at first after the appearance of a high level signal at the SRDY terminal. Therefore, when the reset of the counter 1 is released, the AND gate 6 is in a state to pass a clock signal. The clock signal which is passed through the AND gate 6 is supplied to the SIO register 7. The SIO register 7 shifts the contents with the fall of the clock signal and the overflow bits are output to the $S_{out}$. When the SIO counter 55 detects that a number of bits which are able to constitute a datum is output from the SIO register 7, it generates an interrupt signal for the CPU 101 and requires the CPU to output the next transmitting data. Or it generates a data requiring signal (DRQ signal) for a DMA controller (not shown in a drawing) to require the DMA controller to output the next transmitting data.

Figure 3:
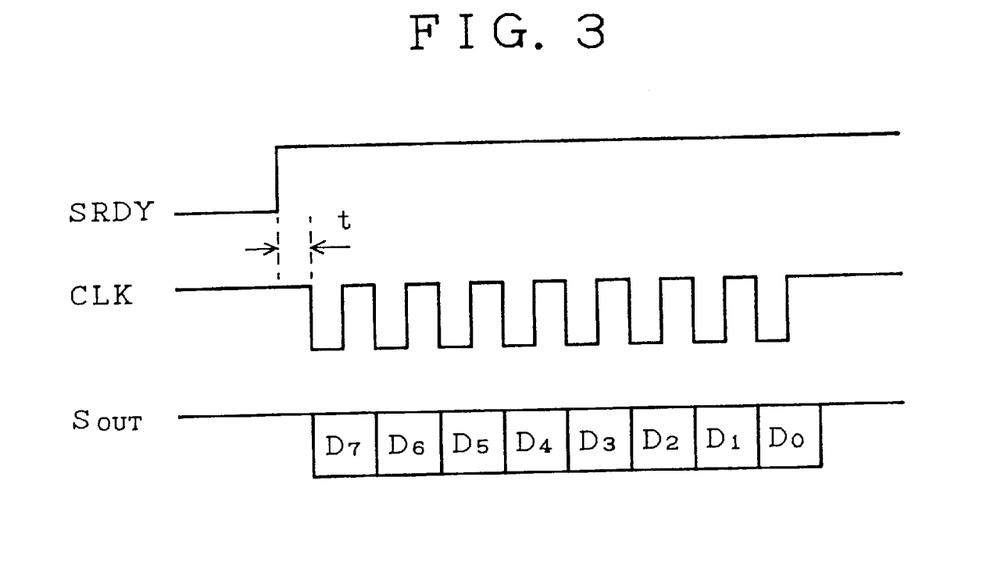
FIG. 3 is a timing chart showing the output timing of data from an SIO.

The sending out of data in the SIO register 7 is started after a lapse of time of 3 cycles of the clock signal $X_{1/4}$ at a maximum by the process described in the above (from the time when the SRDY terminal is made to a high level until the time of a first rise of the clock signal $X_{1/4}$ + from the time of the above-mentioned first rise of the clock signal $X_{1/4}$ until the time when the reversal Q terminal of the DFF 5 is made to a low level + from the time when the reversal Q terminal is made to a low level until the time when the reset of the counter 1 is released). Therefore, the period of time t shown in FIG. 3 is shortened in comparison with that in a conventional case.

In a case where the SIO is initiated into operation after the detection of the appearance of a high level signal at the SRDY terminal by software, the period of time from the point of time when the SRDY terminal is made to a high level until the point of time when the data in the SIO register 7 is started to be sent out is much longer than the above-mentioned period of time. Or in a case where a system is so constituted that the data in the SIO register 7 is output by making the appearance of a high level signal at the SRDY terminal a trigger signal, the phase of the SRDY signal and that of the clock signal are not synchronized, so that the period of time till the sending out of data is initiated is also much longer than the above-mentioned period of time. For example, when the switch 2 selects a clock signal of 1/64 divided frequency, there is a probability that the time of delay can be one cycle of the clock signal at a maximum (When a high level signal appears at the SRDY terminal right after the appearance of the rise of the clock signal, the time of delay becomes maximum.), that is, 1/64 cycle of the clock signal $X_{1/4}$.

Embodiment 2

Figure 4:
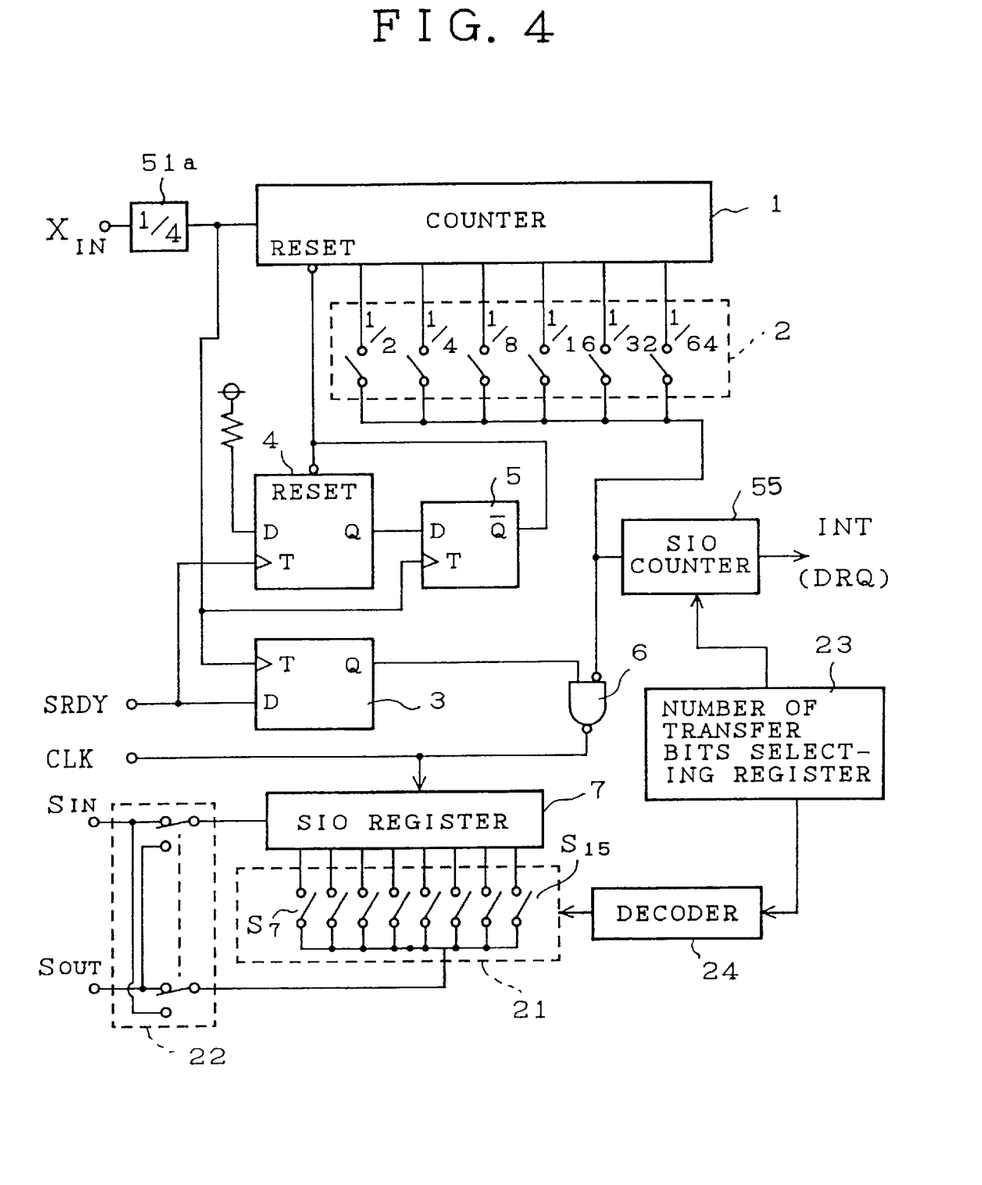
FIG. 4 is a block diagram showing the configuration of a built-in SIO in a microcomputer in an embodiment 2 according to the present invention.

FIG. 4 is a block diagram showing the configuration of an SIO in a microcomputer in the embodiment 2 according to the present invention. In the FIG., 21 is a switch for deciding the takeout positions of input-output signals in the SIO register 7, and 22 is a switch for deciding the input-output direction of the serial data to and from the SIO register 7 which has, for example, contact points, $S_7$ to $S_{15}$. In this example, the bit length in the SIO register 7 is assumed to be 16, and there are provided contact points from the $S_7$ which is to initiate the takeout of data at an eighth bit to the $S_{15}$ which is to initiate the takeout of data at a sixteenth bit. A numerical symbol 23 is a transfer bit selecting register for setting the number of bits which constitute a datum, and 24 is a decoder for decoding the set value set by the transfer bit selecting register. In this place, the switch 22 realizes a changeover means, and the transfer bit selecting register and the decoder 24 realizes a switch setting means.

Next, the operation will be explained. The switch 22 is changed over to either direction by an instruction of the CPU 101. It can be selected by the function of the switch 22 whether transmission-reception is performed from LSB or MSB of the data which are set in the SIO register 7. The transmission-reception of data having an arbitrary bit length is made possible by making an arbitrary contact point of the switch 21 ON.

Figure 9:
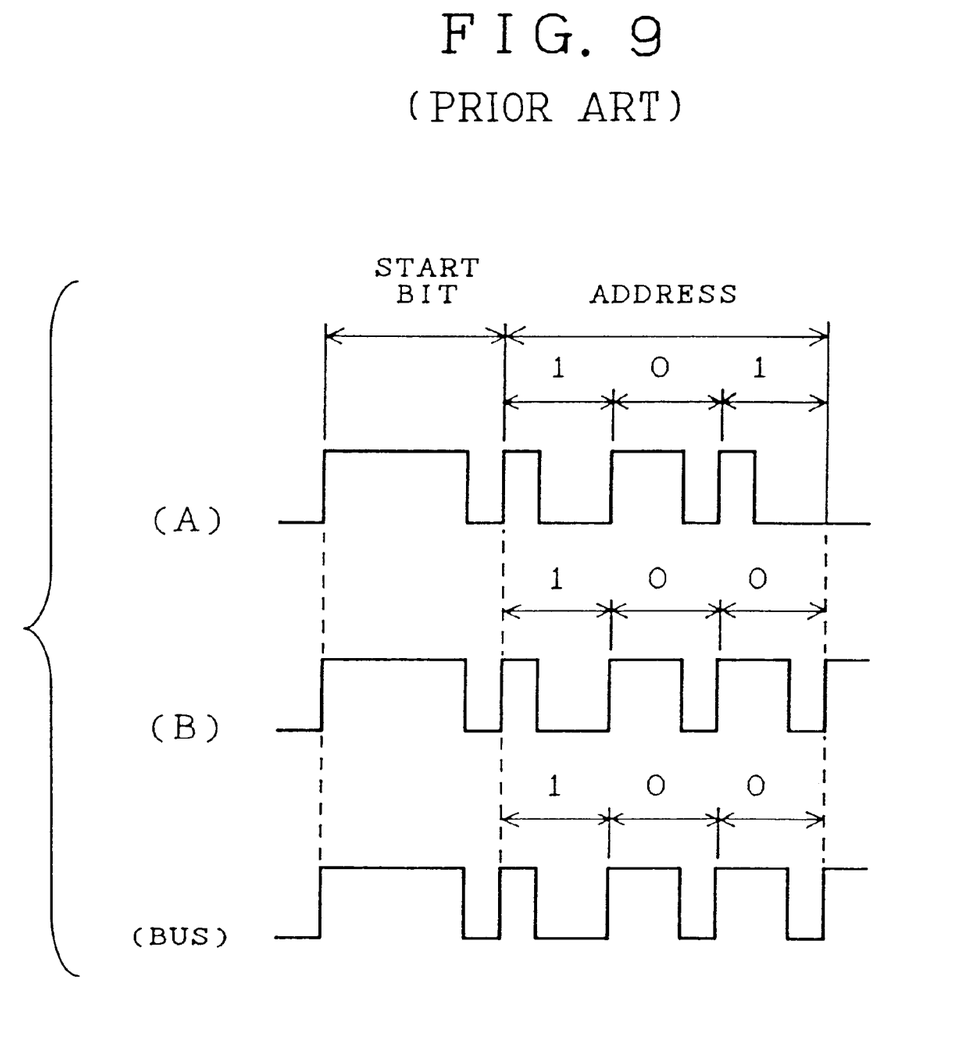
FIG. 9 is a timing chart for explaining an arbitration judgment in the J1850 standard.

For example, as shown in FIG. 9, an example in which a datum is constituted with 12 bits (a datum having a length corresponding to 12 cycles of a clock signal), and 1 bit is expressed by 3 symbols will be taken up. The switch 22 is assumed to be in a state of being thrown to the upper side (a state shown in FIG. 4). When a high level signal appears at the SRDY terminal, similar to the case in the embodiment 1, the output of data (start bit) is initiated from the SIO register 7. In this case, the data from the SIO register 7 are output to the $S_{out}$ terminal through the selected contact point. The CPU 101 sets an OB (H) in the transfer bit selecting register 23. Then the decoder 24 gives a signal which makes only an contact point $S_{11}$ ON to the switch 21. Therefore, the data from the SIO register 7 is output to the $S_{out}$ terminal through the contact point $S_{11}$.

When the SIO counter 55 counts "12 (decimal)", it judges that sending out of 1 bit in the data is completed, and generates an interrupt signal or a DRQ signal. The CPU 101 writes a datum of 12 bits expressing the next bit in the data into the SIO register 7 corresponding to the interrupt signal. Or, the DMA controller transfers a datum of 12 bits to the SIO register 7.

In the case of reception, a receiving serial data input from the $S_{in}$ terminal is shifted toward left in the SIO register 7 in FIG. 4. The SIO counter 55 counts the number of bits in a datum and then outputs an interrupt signal or a DRQ signal requesting the take back of the data.

When the switch 22 is thrown to the lower side, the transmission data are shifted toward left in the SIO register 7 in FIG. 4 and output to the $S_{out}$ terminal. In the case of the reception, a receiving serial data input from the $S_{in}$ terminal is input to the SIO register 7 through a contact point selected by the switch 21, and shifted toward right in SIO register in FIG. 4.

When microcomputers having built-in SIO's respectively are used, it becomes easy to realize a LAN among microcomputers according to the J1850 standard for example. The transfer of a datum of 12 bits which constitutes 1 bit by PWM in communication data can be easily realized by the changeover of contact points in the switch 21.

Embodiment 3

Figure 5:
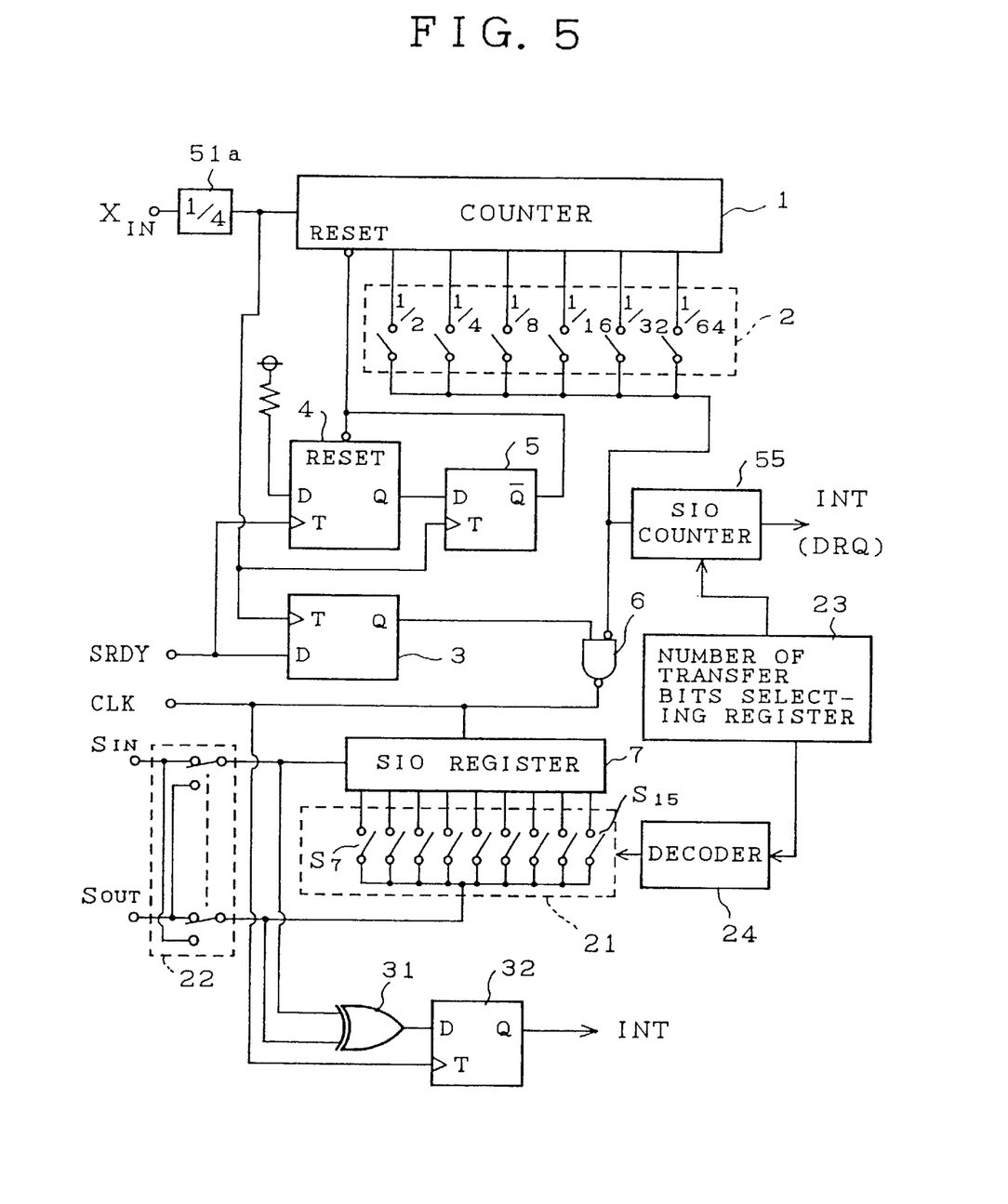
FIG. 5 is a block diagram showing the configuration of a built-in SIO in a microcomputer in an embodiment 3 according to the present invention.

FIG. 5 is a block diagram showing the configuration of an SIO in a microcomputer in a third embodiment according to the present invention. In the figure, 31 is an exclusive-OR circuit for comparing a signal from the $S_{in}$ terminal and a signal to the $S_{out}$ terminal, 32 is a DFF circuit which latches the output of the exclusive-OR circuit with a clock signal. In this case, the exclusive-OR circuit 31 and the DFF circuit 32 realize a comparison means.

Next, the operation will be explained. The basic transmitting-receiving operation of data is the same as that in the case of the first embodiment or in the second embodiment. In this case, a signal at the $S_{in}$ terminal and a signal at the $S_{out}$ terminal are introduced to the exclusive-OR circuit 31. In a case where the signal at the $S_{in}$ terminal and the signal at the $S_{out}$ terminal are different from each other, the exclusive-OR circuit outputs a high level signal. When a high level signal is input to the DFF circuit 32, it latches the signal with a clock signal and outputs it to the Q output terminal. The CPU 101 is able to recognize easily the difference between the signal at the $S_{in}$ terminal and the signal at the $S_{out}$ terminal with the change in the output level at the Q terminal to a high active level.

Figure 6:
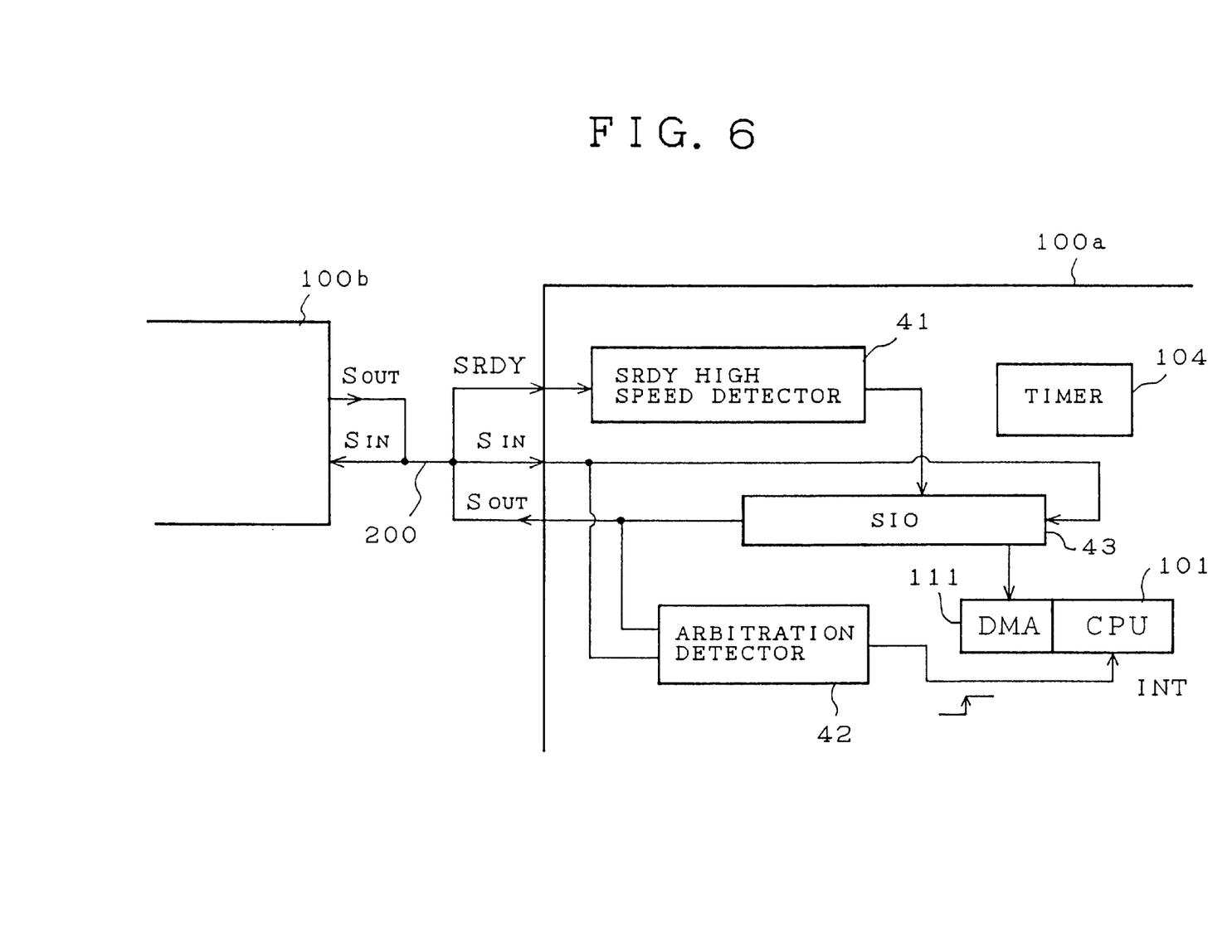
FIG. 6 is a block diagram showing the state wherein half-duplex serial communication in a multimaster system according to the J1850 standard is performed.

The arbitration in a LAN can be realized more easily by the use of a microcomputer having such a built-in SIO. FIG. 6 is a block diagram when half-duplex serial communication is performed in a multimaster system according to the J1850 standard. In the FIG., 41 is an SRDY high speed detector and it corresponds to DFF's, 3, 4 and 5, in FIG. 5. A numerical symbol 42 is an arbitration detector, and it corresponds to the exclusive-OR circuit 31 and the DFF circuit 32 shown in FIG. 5. A numerical symbol 43 is an SIO portion, which is equivalent to a portion comprising the SIO register 7, the switch 21, the number of transfer bits selecting register 23, the decoder 24, and the SIO counter 55. A numerical symbol 111 is a DMA controller. In this example, the bus 200 is connected to the SRDY terminal, the $S_{in}$ terminal and the $S_{out}$ terminal on the master side. It is also connected to the $S_{in}$ terminal and the $S_{out}$ terminal on the slave side.

While a microcomputer 100a on the master side is intending to initiate transmission, if a microcomputer 100b on the slave side initiate the transmission of data, that is, if it sends out a start bit to the bus 200, the rise of the start bit is input to the SRDY terminal on the master side. The SRDY high speed detector 41 immediately detects the rise of the SRDY signal and operates to make data transmission from the SIO portion 43 possible. Therefore, the microcomputer 100a on the master side starts to send out a start bit almost simultaneously.

Following the above operation, both microcomputers on the master side and the slave side output their addresses respectively to the bus 200 at the same timing. As described in the above, since addresses are so allotted that the address of a microcomputer having higher priority data is left on the bus, so that when the priority of data of a microcomputer is lower, the signal at the $S_{in}$ terminal and the signal at the $S_{out}$ terminal are different from each other. In such a case, the output of the arbitration detector 42 rises and an interrupt signal is given to the CPU 101. The CPU 101, in the result of arbitration, recognizes that a transmitting right is not allotted to the microcomputer to which it belongs and suspends transmitting operation by the SIO, and sets the SIO to initiate receiving operation. When an interrupt signal is not generated by the arbitration detector 42, it means that the transmitting right is given to the microcomputer concerned, so that transmitting operation is continued as it is.

In an example shown in FIG. 9, A is assumed to express the master side; on the master side, at the third bit, right after the sending out of a second symbol, a signal at the $S_{in}$ terminal and a signal at the $S_{out}$ terminal are different from each other, so that at the output terminal of the arbitration detector 42 a high level signal appears. At the point of time, the master side microcomputer is able to suspend the transmitting operation.

As described in the above, a CSMA/CD function can be easily realized by the arbitration detector 42. The modulating function of PWM can be realized with the SIO portion 43 and a timer 104. Therefore, a multimaster LAN communication can be realized by only realizing a protocol management function with software. In a similar way, a LAN which does not conform to the J1850 standard can be realized.

As described in the above, when a microcomputer is so constituted that the clock signal supply means which supplies a data transfer clock signal to a serial input-output means in the SIO can be initialized corresponding to an input signal from an external circuit, there is a merit that the delay of an output start timing of a serial data output from the serial input-output means can be decreased in comparison with a case where a signal level is judged by software; thereby, the microcomputer is able to correspond to a LAN which requires a precise timing control such as the arbitration judgment and also able to be applied to high speed serial communication.

When a microcomputer further comprises a changeover means which changes over the direction of an input-output means of a shift register which constitute the serial input-output means, a switch which has contact points to be connected to the midway in the shift register, and a switch setting means which closes a contact point corresponding to the bit length of a datum, the above-mentioned effect can be obtained and also the microcomputer is able to handle the data having an arbitrary bit length easily, and the application range of terminal stations to communicate with can be extended.

Further when a microcomputer is so constituted that an input signal and an output signal to and from a shift register can be compared with each other, there is an effect that a detection load for data collision in a LAN can be lightened in comparison with a case where the signals are compared by software, and a system which is suitable to the application to a LAN can be obtained.

What is claimed is:

1. A microcomputer comprising:
    a serial input-output means for outputting data in converting parallel data into serial data and for converting an input serial data into parallel data;
    a built-in serial input-output circuit having a clock signal supply means for supplying a transfer clock signal to said serial input-output means; and
    an initializing means for initializing said clock signal supply means responsive to a signal from an external circuit;
    wherein said clock supply means is a counter for counting a basic clock signal, and said initialization means resets the counter responsive to a signal from the external circuit.

2. A microcomputer as defined in claim 1, wherein said initialization means initializes said clock supply means responsive to a receiving preparation completion signal from another microcomputer.

3. A microcomputer as defined in claim 1, wherein said serial input-output means is a shift register, and said microcomputer comprises a changeover switch for changing over the input-output direction of said shift register, a switch having contact points to be connected to the midway in the shift register and a switch setting means for closing one of said contact points corresponding to the bit length of a datum.

4. A microcomputer as defined in claim 3, further comprising a counter for requesting the next data after finishing the count of clock pulses corresponding to the bit length of a datum.

5. A microcomputer as defined in claim 3, further comprising a comparison means for comparing an input signal and an output signal to and from the shift register.

6. A microcomputer as defined in claim 5, wherein said comparison means comprises an exclusive-OR circuit for detecting the discordance between the input signal and the output signal to and from the shift register and a flip-flop circuit for latching the output of said exclusive-OR circuit.

7. A microcomputer as defined in claim 1, wherein said initialization means comprises flip-flop circuitry for supplying a reset signal to said counter in response to said external circuit signal.

8. A microcomputer comprising:

a serial I/O register for performing data conversion;

a built-in serial input-output circuit comprising a resettable counter for counting a basic clock signal and supplying a transfer clock signal to the serial input-output register; and flip-flop circuits responsive to an external signal for resetting said counter circuit.

9. A network computer system, comprising:

first and second microcomputers on a common network, each microcomputer comprising:

a serial input-output register for outputting data and performing parallel-serial and serial-parallel data conversion;

a built-in serial input-output circuit including a resettable counter for counting a basic clock signal and supplying a transfer clock signal to the serial input-output register; and an initialization circuit responsive to a receiving preparation completion signal from another microcomputer for resetting said counter.

* * * * *